No. 867,133. PATENTED SEPT. 24, 1907.
J. HOLMER.
SEAL FOR CAR DOORS.
APPLICATION FILED JULY 29, 1907.

Witnesses

Inventor
John Holmer,
by Chas. C. Tillman atty

UNITED STATES PATENT OFFICE.

JOHN HOLMER, OF SOUTH CHICAGO, ILLINOIS, ASSIGNOR OF ONE-HALF TO CARL M. STRAND, OF SOUTH CHICAGO, ILLINOIS.

SEAL FOR CAR-DOORS.

No. 867,133.　　　　Specification of Letters Patent.　　　　Patented Sept. 24, 1907.

Application filed July 29, 1907. Serial No. 385,952.

*To all whom it may concern:*

Be it known that I, JOHN HOLMER, a citizen of the United States, residing at South Chicago, in the county of Cook and State of Illinois, have invented certain new and useful Improvements in a Seal for Car-Doors, of which the following is a specification.

This invention relates to improvements in seals, for car doors, of the automatic or self-locking type, and it consists in certain peculiarities of the construction, novel arrangements and operation of the various parts thereof, as will be hereinafter more fully set forth and specifically claimed.

The principal object of the invention is to provide a simple, inexpensive and reliable construction, which involves a positive automatic engagement of the two ends of the shackle within the shell or casing, and which will not permit of the withdrawal or detachment of such ends after engagement without apparent mutilation of the shell or casing. Further objects and advantages of the invention will be disclosed in the subjoined description and explanation.

In order to enable others skilled in the art to which my invention pertains, to make and use the same, I will now proceed to describe it, referring to the accompanying drawing, in which—

Figure 1:
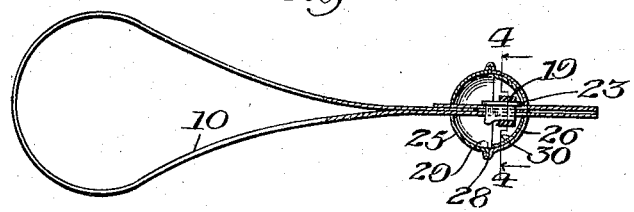
Figure 2:
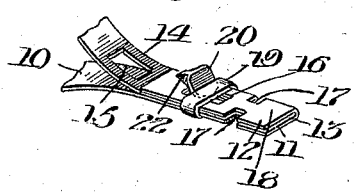
Figure 3:
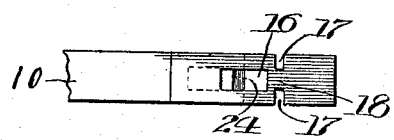
Figure 4:
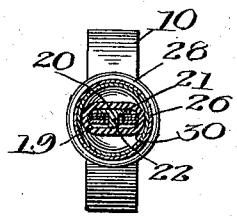
Figures 6, 7:
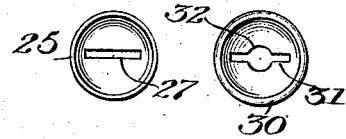
Figure 5:
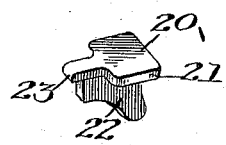

Figure 1 is a side view, partly in section and partly in elevation, of a seal embodying my invention, showing the parts in their locked positions. Fig. 2 is a fragmental perspective view of the ends of the shackle, illustrating the means for securing them together, and the parts in the position they will occupy just prior to the engagement of the ends of the shackle, the shell or casing being omitted in said view. Fig. 3 is a plan view of a portion of the shackle, showing the removable end thereof, partly inserted in the guide way therefor, on the other end. Fig. 4 is an enlarged cross sectional view taken on line 4—4 of Fig. 1, looking in the direction indicated by the arrows. Fig. 5 is an enlarged perspective view of the locking dog or catch, showing it detached. Fig. 6 is an inner view of one of the members of the shell or casing;—and—Fig. 7 is a similar view of the guard member of the casing.

Like numerals of reference refer to corresponding parts throughout the different views of the drawing.

The reference numeral 10 designates the shackle, which is made of a narrow strip of sheet metal or other flexible material which may be bent to form a loop, as shown in Fig. 1 of the drawing. A portion of one end 11 of the shackle is provided with a part or flap 12, which is bent over so as to lie longitudinally with respect to the end 11, and slightly above the same, thus forming a guide way 13 for the reception of the other end 14 of the shackle, which is formed with a rectangular opening 15, for the reception and operation of a portion of the locking dog, as will be presently explained. As is clearly shown in Figs. 2 and 3, the portion 11, as well as the member 12, is provided with a rectangular opening 16, which is adapted to register with the opening 15 when the portion 14 is inserted between the portion 11 and member 12. Outwardly from the opening 16, the portion 11 and flap 12 are provided with recesses 17 in their edges, thus leaving a narrow stem 18 between said recesses. Surrounding the portion 11 and flap 12 and a portion of their openings 16, is an elastic band 19, which is used for the purpose of actuating the locking dog or catch 20, which is preferably of substantially the form shown in Fig. 5, that is, it has at its upper portion a flat plate 21, from which depends a cam-shaped projection 22, which is adapted to pass through the openings in the parts 11, 12 and 14, and to lock them together as is shown in Fig. 1 of the drawing.

By reference to Fig. 5, it will be seen that the locking dog 20 has at one of its ends, a flange 23, which projects beyond the upper portion of the projection 22, and is designed to rest on the transversed portion 24 or free end of the member 14 when the parts are in a locked position. The shell or casing which surrounds the locking dog 20 and the retaining band 19 therefor, comprises two semi-spherical members 25 and 26, each of which is formed with a diametrical slot 27, to receive the portions 11 and 12 of the shackle. The members 25 and 26 are counterparts of one another, except that one of said members, for instance, 26 is formed at its periphery with a flange 28 to overlap a shorter flange 29, on the periphery of the other member, when it is desired to secure them together. Located within the cavity of the member 26, is a guard member 30, which is semi-spherical in shape and is provided with a diametrical slot 31, for the passage of the parts 11 and 12, and has a centrally enlarged opening 32 for the reception of the stem 18 and to permit said member being turned thereon.

The operation of the device is simple and as follows:— The projection 22 of the locking dog 20, is placed in the opening 16 of the flap or portion 12, so that it will assume substantially the position shown in Fig. 2, that is to say, so that the flange portion 23 will depend in said opening, as well as in the opening in portion 11, while the projection 22 will rest on the edge of the opening 16, farthest from the end of the portion 11. The elastic band 19 is then placed in about the position shown in Fig. 2, when the guard member 30 may be slid up to the position thereof, shown in Fig. 1, by passing the portions 11 and 12 through the slot 31, when by turning said member until said slot is located at a right angle to the surface of the portion 12, after which the members 25 and 26 may be brought together and clenched by bending the flange 28 on one of them, over the flange 29 on the other one, by means of a suitable instrument or otherwise. It should be understood that the member 25 of the casing should be placed on the portions 11 and 12 before the locking dog is placed in position. After the parts have been thus assembled, the portion 14 of the shackle is slid in the guide way 13, between the portions 11 and 12, in which space it is apparent that the free end of the member 14, will strike the cam surface of the projection 22, and thus slightly raise the dog 20, the elastic band 19 permitting of such movement of the dog. By pressing the portion 14 farther towards the end of the portion 11, it is apparent that the projection 22 on the dog 20, will pass through the opening 15 in the portion 14, and by reason of its gravity, as well as by reason of the action of the band 19, said dog will assume the position shown in Fig. 1, or so that its plate 21 and flange 23 will rest on the upper surfaces of the portions 12 and 24 respectively, thus firmly locking the ends of the shackle together and in such a manner that they cannot be separated without detection.

Having thus fully described my invention, what I claim as new, and desire to secure by Letters-Patent, is—

The combination with a shackle having near one of its ends an opening and provided at its other end with a longitudinally disposed and spaced apart member, the said member and underlying portion of the shackle each having an opening in register with one another, and also provided with recesses in their edges, of a locking-dog having a projection adapted to engage the openings in the ends of the shackle, and also means to prevent it passing entirely through said openings, an elastic band surrounding the longitudinal member and underlying portion of the shackle at the openings therein, and adapted to retain the dog, first in its inclined position, and afterwards in its locking position, a guard-member rotatably mounted on the shackle at the recesses therein, a shell or casing member movably mounted on the shackle near each end of the opening in said longitudinal member, and means to secure said shell or casing members together, around the dog, band and guard-member.

JOHN HOLMER.

Witnesses:
E. M. LINDHOLM,
CHAS. C. TILLMAN.